UNITED STATES PATENT OFFICE.

CLIFFORD D. HOLLEY, OF ST. LOUIS, MISSOURI, ASSIGNOR TO ACME WHITE LEAD AND COLOR WORKS, OF DETROIT, MICHIGAN, A CORPORATION OF MICHIGAN.

PROCESS OF MAKING PIGMENTS.

1,123,743. Specification of Letters Patent. Patented Jan. 5, 1915.

No Drawing. Application filed October 25, 1910. Serial No. 588,973.

*To all whom it may concern:*

Be it known that I, CLIFFORD D. HOLLEY, a citizen of the United States, residing at St. Louis, in the county of St. Louis City and State of Missouri, have invented certain new and useful Improvements in Processes of Making Pigments, of which the following is a specification.

This invention relates to processes of making pigments; and it comprises a method of making oxids of lead for pigmentary purposes, wherein finely divided lead is treated with a reaction-inducing quantity of nitric acid and aerially oxidized to the desired stage of oxidation; all as more fully hereinafter set forth and as claimed.

In the ordinary processes of making red lead or minium, it is usual to oxidize lead at a temperature below the fusing point of lead oxid to produce what is known as massicot, and this massicot, usually after grinding and levigation, is reoxidized to form the red lead. In this second oxidation the temperature is also kept below the fusing point of lead oxid. Fused oxid of lead, or litharge, is not suitable for making red lead; probably because it does not readily absorb oxygen. Other methods of making red lead depend upon oxidation of metallic lead by means of fused oxidants, such as saltpeter.

A pigment must be in the finest possible state of subdivision; as nearly a molecular subdivision as possible. For this reason it is desirable that the oxid of lead used in producing red lead shall be very finely divided *ab initio*, that it shall retain this fine state of subdivision throughout the operation and that the finished red lead shall be similarly fine-particled. In the oxidation of the protoxid of lead, furthermore, it is found that the production of red lead is not feasible unless a very finely subdivided condition of the oxid exists. With ordinary massicot, where no substantial fusion is permitted a tolerably fine state of subdivision may be attained. But the operation where ordinary massicot is used is unduly tedious and expensive in time and labor, since the massicot is obtained in the usual methods only by a slow and expensive operation, and undergoes conversion into red lead slowly and with difficulty; a fact due to its not being as fine-textured as is desirable. A very good article of minium or red lead can be made by the oxidation of white lead (basic carbonate), but this material is of course too expensive for ordinary purposes.

In the present invention I have devised a new method of producing red lead and other oxids of lead by a simple, cheap and ready process wherein finely divided lead, such as moss lead, lead dust, and the like, is treated with water containing a minimal quantity of nitric acid and thereafter allowed to undergo an aut-oxidation.

In the present process the particles of lead may be said, in a way, to effloresce, becoming converted into a fluffy body of the hydrated oxids.

The nitric acid is used merely in quantity sufficient to start the reactions, and the acid, together with the nitrates, nitrites, oxids and other products formed, is, so to speak, a catalytic body or oxygen carrier, rather than an active agent in the oxidation. Its function is to form a small amount of oxidized lead compounds and start the reaction. It is also an important function of the acid in the present invention to cause the mass of lead to swell or puff up into a voluminous sponge-like mass of great porosity, which the oxygen of the air easily permeates, reaching to all parts of the mass with consequent acceleration of the oxidizing reaction. The extent of this swelling or puffing action varies somewhat with the exact amount of acid used and with the details of manipulation, but ordinarily the volume of the mass at the end of the corrosion is about double that of the original mixture. This inflation of the mass of lead is comparable to what occurs in slaking lime, where the moistened mass of lime swells and puffs as the hydration proceeds. It is probable that both in the case of the lime and the lead, the material in the swollen condition is in a state of very minute subdivision, existing practically as separate particles. The lead molecules as they oxidize and hydrate form a loose and open or spongy textured mass and through this spongy mass air readily penetrates to continue the oxidation. The molecular contact of the moist oxids with unchanged lead also probably operates to set up an electrical couple and aid in the self-acceleration of the oxidation.

Instead of nitric acid, other easily decomposable bodies containing the nitric group, such as saline derivatives of nitric acid, such as ammonium nitrate, sodium nitrate, etc., either alone or in connection with nitric acid, may be employed to react with the comminuted lead to produce results similar to those attained in the method of oxidation described above employing the acid alone. For the purposes of the present invention these bodies however offer no particular advantages over nitric acid. In a copending application Ser. No. 608,105, filed February 11, 1911, I claim an analogous process of producing oxids of lead in which alkali nitrates are employed.

As to the precise nature of the reactions which take place in the first stages of the present method I cannot speak definitely and I content myself with stating the operations which I perform without any attempt to go into the mechanism of the chemical changes involved. The quantity of nitric acid employed in the method is always very small and it may be as low as one to five pounds of 50 per cent. nitric acid, or even less, for every 100 pounds of lead; a quantity too small to give any complete oxidation by its own action alone. With nitric acid, however, where too little acid is used, the lead does not swell properly and the conversion is unsatisfactory.

In the embodiment of my invention at present preferred, I mix the finely divided lead, which may be moss lead, powdered lead, lead shavings, etc., with sufficient dilute nitric acid to make the mass initially somewhat wet or sloppy, the quantity of strong nitric acid used being advantageously about 1 per cent. of the lead treated. The wet mass is then allowed to undergo aut-oxidation in the presence of air. It may be simply spread out on a concrete floor as a layer and allowed to stand, or it may be treated in revolving drums, etc. Air is allowed free access to the mass, either by natural draft and circulation or by artificial draft; this depending mainly upon the nature of the apparatus used. The nature of the apparatus is not material to the present invention nor is the method of supplying air. Under these conditions a series of successive reactions takes place, apparently involving the complex chemistry of the nitrates and nitrites, etc., of lead. Whatever may be the chemical changes involved in these reactions, there is substantially no evolution of oxids of nitrogen. With the wet mass on a concrete floor exposed to the atmosphere, the mass begins to increase in volume in a short time and passes from a distinctly sloppy condition to a slightly moist state in 24 hours. Apparently the water, or much of it, goes into combination with the oxidized products of the lead. This disappearance of water is accompanied by a marked rise of temperature and an evolution of ammonia in notable quantities. While passing into the slightly moist condition the evolution of ammonia is rapid and the thermometer will exhibit a temperature of from 60° to 70° C. Advantageously, during the aut-oxidation the mass is stirred from time to time and water is added to maintain a slightly moist condition. Ordinarily the evolution of ammonia practically ceases in about 48 to 72 hours from the time of the initial treatment, and the temperature drops slowly to the normal atmospheric temperature.

The lead used in the process may be advantageously that produced by bringing molten lead into contact with a jet of superheated steam in a suitable device, which may be similar in principle to that of the ordinary blast devices, such as those used in laboratory blast lamps, oil burners, etc. Or it may be the residual particles resulting from oxidation of various sized lead granules with water and air in suitable devices; or the lead particles obtained as tailings or residues after grinding and separating, either wet or dry, litharge, massicot or other oxids of lead made by direct oxidation of metallic lead. Using these finely divided lead particles and treating in the manner just described, after the completion of this first reaction the mass exhibits a greenish yellow color and is composed essentially of granules varying in size from an eighth inch or less to two inches, according to the method pursued in working the mass from time to time. These granules are very porous and take up water with considerable avidity. If there be residual metallic lead in the granules, as there sometimes is, the treatment with water in the presence of air will result in a further oxidation although in this further oxidation there is little, if any, of the noticeable rise in temperature accompanying the first operation, neither is there noticeable evolution of ammonia.

Treating finely divided lead by the described process, I have been able to obtain as high as a 75 per cent. conversion with as little nitric acid as a pound of the 50 per cent. acid to 100 pounds of metallic lead.

The hydrated lead oxid obtained as so described is suitable for use, after it has been separated from metallic residues in the manufacture of white lead by treatment with water and carbon dioxid in a suitable device. Or it may be dehydrated at a temperature below its fusing point, to convert it into an unfused litharge (massicot). Or it may be fused and converted into a flake litharge, or litharge of a similar type. It is, however, particularly suitable for the formation of red lead or minium since with careful heating it may be converted into red lead of a particularly fine quality. The material is almost molecular in its subdivision and in oxidation to red lead the oxygen of the air can gain access to all portions of the mass, while after the oxidation, the fine state of subdivision still exists.

In the manufacture of red lead, the product obtained as described above may be preliminarily heated in a furnace of suitable type to secure oxidation of any small particles of metallic lead remaining in the product after the preliminary oxidizing treatment. This finishing oxidation is greatly assisted by the porous nature of the granules and the chemical nature of the already converted portion which is composed of very complex molecules of a basic nature which break down at the furnace temperature, assisting materially in the oxidation of the unconverted metal and at the same time keeping any small lead globules from running together while undergoing the heat and oxidation.

In a specific embodiment of the present invention, 2500 pounds of moist lead particles in a medium state of subdivision may be placed on a cement floor and 25 pounds of 50 per cent. nitric acid, together with 50 pounds of water rapidly worked into the mass of lead. These materials may be at the ordinary temperature. With this amount of acid and water the mass will become decidedly sloppy, the temperature rising to 30° to 35° C. and the volume of the mass increasing noticeably. In about 30 minutes the mass may be spread out on the floor to a depth of about six inches to give opportunity for aerial oxidation. The temperature soon drops to normal. In about 24 hours, the mechanical water present disappears to an extent sufficient to make the mass apparently merely moist and the temperature begins to rise again. If the heap be worked over or stirred so as to permit ready contact with the air the rise in temperature will be rapid. Usually the temperature will go up to a limit of about 60° to 70° C. An evolution of ammonia in notable quantities will be found to accompany this rise in temperature. Apparently most of the nitrogen of the nitric acid used comes off the mass in the form of ammonia. Where the oxidation is performed in suitable containers, this evolved ammonia may be condensed and recovered; where the oxidation is performed on a floor, it may be simply allowed to go to waste. In order to prevent the mass becoming completely dried, which might occur from the combination of the water with the oxidation products, and to a less extent from evaporation, the heap or mass is advantageously moistened and stirred from time to time, the moistening being done with warm water. Ordinarily the temperature begins to drop in from 24 to 36 hours from the beginning of the second rise in temperature described. When the temperature finally drops nearly to normal the odor of ammonia is faint. The material should be moistened and stirred once a day or oftener for one to three days more to secure a conversion of a portion of the remaining metal, if any, in the granules. This treatment at the same time causes further changes in the nature of the converted portion, making it more advantageous for the production of a superior grade of red lead.

For the preparation of red lead the mass, after it has undergone the treatment described above, is furnaced at a temperature not exceeding 600° C., and the massicot thus obtained is reduced to an impalpable powder, any metallic particles being removed. The massicot is itself of a peculiarly porous nature. The mass of hydrated oxids from which it is made being in a practically molecular state of division, and there being no fusion in the massicot-forming operation, the resulting massicot is also of the same extreme fineness. The massicot is then furnaced to form red lead, this conversion being performed with great ease owing to the voluminous and finely divided nature of the product.

By careful oxidation in the red lead forming operation, a red lead of very fine quality is obtained, its fineness of texture being comparable with that of the original oxids and of the massicot obtained therefrom. A cubic inch of red lead produced by the ordinary processes, loosely shaken down, generally weighs about 22 to 24 grams whereas red lead can be obtained by the present process weighing as little as 15 grams per cubic inch. If a denser red lead is desired, the original oxidation should be interrupted at the point where the evolution of ammonia is still vigorous and the oxids furnaced and ground as described. With this procedure, dense red lead running 20 to 22 grams per cubic inch may be obtained.

In operation the present process, with aut-oxidation of the lead, the output of ordinary litharge and red lead furnaces may be about doubled.

As stated, instead of allowing the first operation of oxidizing the metallic lead to continue as long as described above, I may cut the treatment with nitric acid and air down to about 36 hours, and furnace the resulting porous mass to produce massicot and red lead in the usual way. Owing to the high degree of porosity of the corroded lead, the conversion takes place very rapidly in this case also. The red lead thus obtained weighs about 20 to 22 grams per loosely packed cubic inch, resembling ordinary red lead more closely therefore than the red lead obtained from the process first described.

The term "aut-oxidation" as employed herein is used merely as a convenient expression to indicate the apparent character of the chemical changes which occur in treating metallic lead to obtain lead oxids according to the present process. The oxidation may be due to a kind of catalytic or carrier action on the part of some form of lead oxid formed on the surface of the lead whereby more of the lead is progressively transformed into oxid. Or it may be in the nature of an electrolytic oxidation by reason of the formation of lead-lead oxid couples at abutting surfaces of lead and lead oxid.

What I claim is:—

1. The process of producing oxids of lead which comprises moistening metallic lead with water containing a relatively small amount of nitric acid and allowing the mass to undergo a progressive spontaneous oxidation by and in the presence of air to form oxids of lead.

2. The process of producing oxids of lead which comprises moistening comminuted metallic lead with sufficient water acidulated with nitric acid to form a sloppy mass and allowing the mass to undergo aut oxidation in the presence of air to form oxids of lead.

3. The process of producing oxids of lead which comprises moistening comminuted metallic lead with sufficient water acidulated with nitric acid to form a sloppy mass, allowing the mass to undergo aut oxidation in the presence of air to form oxids of lead, stirring said mass occasionally, and treating the mass with sufficient water to maintain it moist.

4. The process of producing oxids of lead which comprises moistening metallic lead with water containing a quantity of strong nitric acid equal to about one per cent. of the weight of the lead being treated, and allowing the mass to undergo spontaneous oxidation by and in the presence of air to form oxids of lead.

5. In the manufacture of oxids of lead, such as litharge, massicot, and red lead, the process which comprises moistening metallic lead with water containing a relatively small amount of nitric acid, allowing the mass to undergo spontaneous oxidation by and in the presence of air to form hydrated oxids, and finally heating said hydrated oxids in the presence of air to obtain an oxid.

6. The process of producing red lead which comprises moistening metallic lead with water containing nitric acid to the extent of about one per cent. of the weight of said lead, allowing the mass to undergo aut oxidation in the presence of air, occasionally stirring the mass, adding water to maintain the proper degree of moisture, furnacing the oxids thus produced to form massicot, separating unconverted particles of metallic lead from the massicot, and furnacing the massicot under suitable conditions to obtain red lead.

7. The process of producing oxids of lead which comprises subjecting metallic lead to the action of an agent containing the nitric group dissolved in a limited quantity of water, and permitting spontaneous oxidation of the lead to occur by and in the presence of air.

8. The process of producing oxids of lead which comprises subjecting metallic lead to the action of an agent containing the nitric group dissolved in a limited quantity of moisture, and permitting spontaneous oxidation of the lead by and in the presence of air to produce highly porous hydrated oxids of lead.

9. The process of producing oxids of lead which comprises superficially oxidizing a mass of metallic lead with a relatively small amount of a body containing the nitric group in an oxidizing environment and in the presence of a limited quantity of moisture, and allowing a spontaneous aut oxidation of the lead to continue by air until a spongy, porous, oxidized mass is produced.

10. In the manufacture of oxids of lead, the process which comprises producing oxidized lead in porous spongy form by causing a spontaneous oxidation of comminuted lead by air in the presence of a relatively small amount of a mineral acid contained in a limited quantity of moisture, and furnacing such porous material under suitable oxidizing conditions to obtain higher oxids of lead.

11. In the manufacture of oxids of lead, the process which comprises producing oxidized lead in porous spongy form by causing a spontaneous oxidation of comminuted lead by air in the presence of a relatively small amount of a mineral acid contained in a limited quantity of moisture, furnacing such porous material in the presence of air at a temperature somewhat below its fusion point to form a massicot, and further treating the massicot to obtain red lead.

12. In the manufacture of oxids of lead, the process which comprises producing oxidized lead in porous spongy form by causing a spontaneous oxidation of comminuted lead by air in the presence of a relatively small amount of a mineral acid contained in a limited quantity of moisture, furnacing such porous material in the presence of air at a temperature somewhat below its fusion point to form a massicot, separating particles of unconverted metallic lead from the massicot, and furnacing the thus refined massicot under proper oxidizing conditions to form red lead.

13. In the manufacture of oxids of lead, the process which comprises submitting lead to an efflorescent spontaneous oxidation by treating metallic lead with air in the presence of a limited amount of moisture containing an oxidizing mineral acid.

14. In the manufacture of oxids of lead, the process which comprises submitting lead to a spontaneous aerial oxidation in the presence of moisture containing a catalytically acting oxidant to produce a hydrated porous oxidized product and furnacing said product to produce an anhydrous oxid of lead.

15. The process of producing lead pigments which comprises treating suitably comminuted lead with a relatively small quantity of a weak aqueous solution of nitric acid in the presence of air, permitting a progressive aut oxidation of the lead to obtain porous hydrated oxides of lead, separating unconverted metallic residues, and treating said hydrated oxides to produce a lead pigment.

In testimony whereof, I affix my signature in the presence of witnesses.

CLIFFORD D. HOLLEY.

Witnesses:
F. C. HOLLEY,
C. M. LEACH.